United States Patent [19]

Dick, Jr.

[11] Patent Number: 5,619,949

[45] Date of Patent: Apr. 15, 1997

[54] MULTI-POSITIONAL MARINE SEAT BOLSTER

[76] Inventor: Edward F. Dick, Jr., 5188 Chesapeak Ave., Shadyside, Md. 20764

[21] Appl. No.: 524,347

[22] Filed: Sep. 6, 1995

[51] Int. Cl.$^6$ .................................................. B63B 17/00
[52] U.S. Cl. ................................. 114/363; 297/338
[58] Field of Search ............................ 114/194, 363; 297/335, 336, 337, 353, 338, 313, 339

[56] References Cited

U.S. PATENT DOCUMENTS

| | | | |
|---|---|---|---|
| 3,222,106 | 12/1965 | Stout | 297/338 |
| 3,679,260 | 7/1972 | Morse-Brown | 297/338 |
| 4,934,303 | 6/1990 | Lathers | 114/363 |

Primary Examiner—Edwin L. Swinehart

[57] ABSTRACT

A marine vehicle comprising a hull, a deck supported by the hull, and a seat apparatus mounted on the deck. The seat apparatus includes a seat back "member with side supports" assembly whose members include a seat back, side supports, and a frame moveable and pivotal between a lower position wherein the seat back is tilted back 5–40 degrees, and a upper position wherein the seat back is generally vertical. The seat apparatus also includes a seat "bottom member" base assembly whose members include a seat base and a frame which are pivotal independent of the seat back assembly. The seat "bottom member" base assembly rotates between a generally sloped back from horizontal position to a generally vertical position. Also included in the seat apparatus are mechanisms for holding a seat back assembly and a seat "bottom" base assembly into their positions.

5 Claims, 3 Drawing Sheets

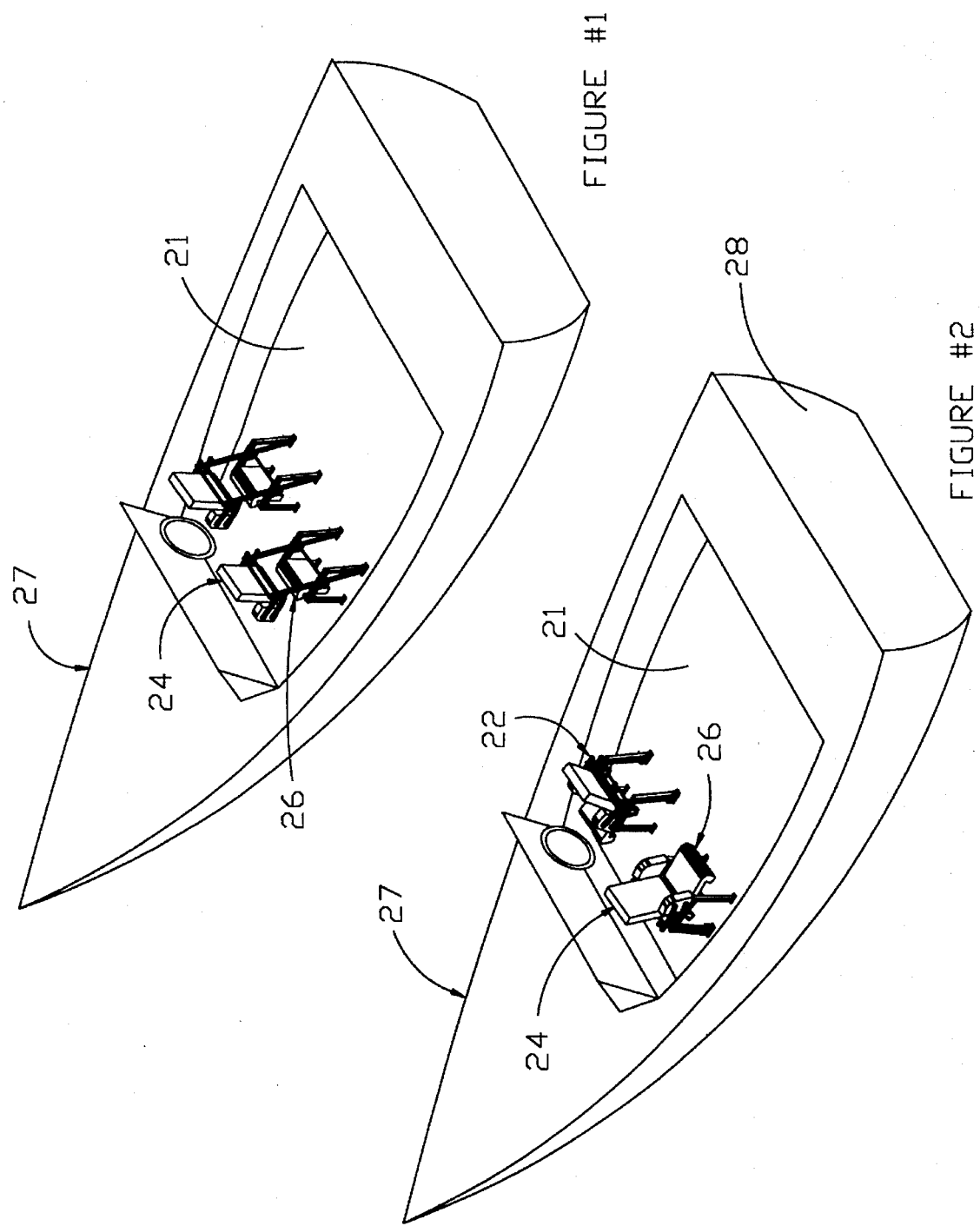

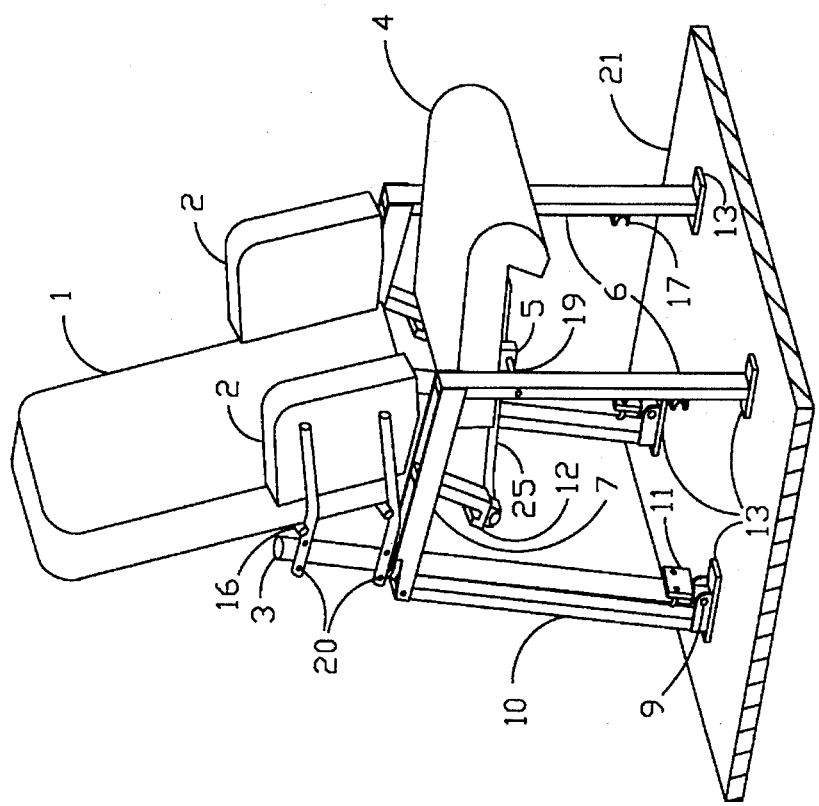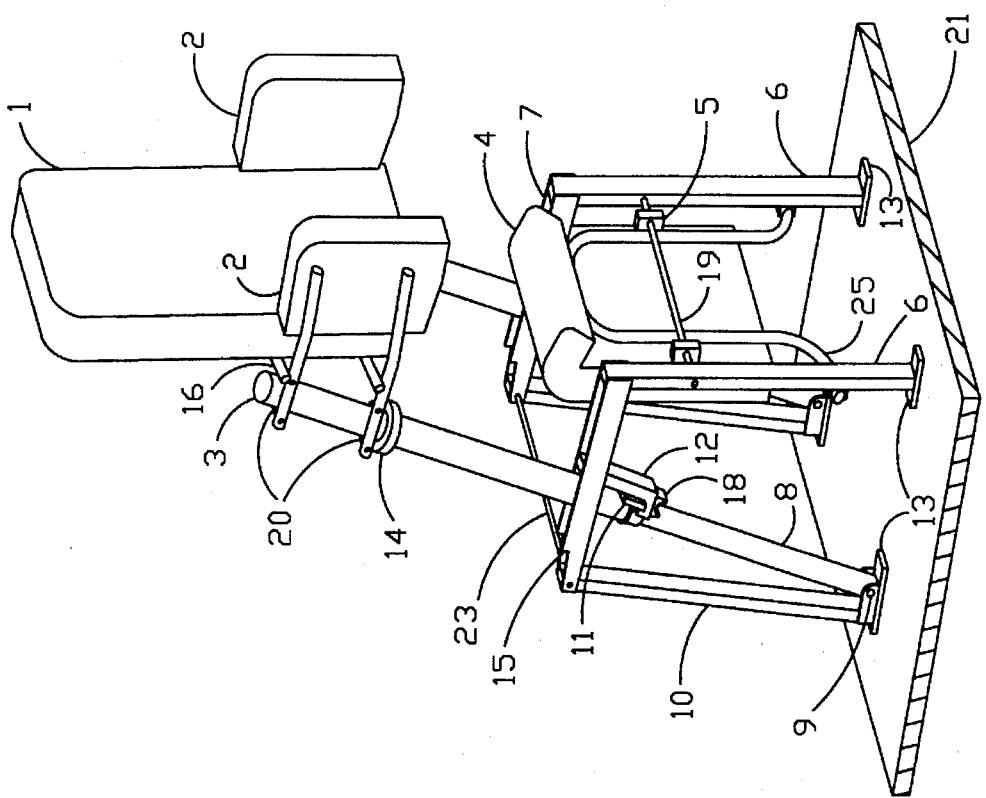

STANDING

LEANING

SEATING

MULTI-POSITIONAL MARINE SEAT BOLSTER

BACKGROUND—FIELD OF INVENTION

The invention relates to commercial, recreational, and performance boats. More particularly, the invention relates to seats and apparatus for supporting the body when sitting, standing or leaning in a boat, such as a seat or bolster.

BACKGROUND—DESCRIPTION OF PRIOR ART

It is commonly known that standing in a boat is a more comfortable position than sitting when the boat is encountering impacts from hitting the waves. The legs act as shock absorbers to isolate the upper body from the impacts. Standing also improves visibility, especially when the bow of the boat is high due to the boats acceleration or riding waves.

Standing while driving a boat can be a dangerous position when being thrown around by the impact from waves. Many people have been injured or killed after being thrown from their boats.

Currently available are marine seats for sitting, bolster seats with hinged seat bases for sitting or standing, and bolsters for standing only.

To have the body supported properly in the standing position a bolster or bolster seat is required. For boats other than racing, standing all the time in a bolster is undesirable. The bolster seat with a hinged seat base is only good if the boat is large enough that the seat base and side support can be located below the gunwale and steering wheel. Enough vertical height must be available below the seat base hinge to allow extension of the legs. Most recreational boats that are subject to the higher impact loads from waves are not large enough to have the required vertical height between the gunwale and deck for this type of seat. Sitting up as high as required in these hinged bottomed seats for most recreational boats would put the driver too far from the controls. Also putting the center of gravity of the individual in the sitting position above the gunwale could be uncomfortable due to the increased lateral forces, and dangerous because the gunwale no longer offers protection from an undesired exit from the boat.

U.S. Pat. No. 4934303 shows a marine seat/bolster which can be used for sitting or standing. This seat is not commercially available. Cost of manufacture would be expensive due to its complex design and electric drive motor.

Other limitations of this design are:

a) The bulkiness of the seat would create fitting problems into smaller boats.

b) The ergonomics have not been set up for proper body support when standing. The hips and lower back need support when standing. The seat base needs to move entirely out of the way, to provide sufficient space for the legs to spread and the body to stand erect.

c) There is no third position for supporting the body when leaning into the seat.

The invention described herein allows the boat occupant a relaxed seating position at a conventional seat base height above the deck, or a secure standing or leaning position.

OBJECTS AND ADVANTAGES

The object of this invention is to provide a structure to secure an individual sitting, leaning, or standing while riding in a boat.

While safety of the occupant of a boat is a primary concern of this invention, operation of a boat with the body secured in a standing position provides comfort, confidence, visibility, and enjoyment to traveling on the water.

Several advantages of this invention are as follows;

a) Offers smaller boats the protection provided by bolsters currently available for larger performance and race boats. The smaller boats experience the roughest ride yet no bolsters are available for them. This invention provides the combination of conventional marine seating and a marine bolster for supporting and securing the occupant of a boat while sitting, leaning or standing.

b) A simple design. The invention therein has a quick and easy method for changing from a seat to a bolster. To change from sitting to standing the occupant stands up, flips the seat base assembly from horizontal to vertical. The seat base assembly is held in place with snaps. The occupant then reaches behind with both hands and raises the seat back assembly up while pivoting it forward to the upper position. There the seat back assembly is released and it drops downward where the latches engage into the hooks. The sequence is reversed to change back to sitting.

c) The apparatus is economically and physically designed to replace seats in smaller boats. The apparatus must be affordable and fit properly into smaller boats.

d) The apparatus has been designed and tested to be ergonomic. The seating position layout optimizes anthropometric data for human comfort. The standing position supports the hips and back while leaving clear an appropriate area for the legs.

e) A third position has been introduced for leaning into the seat. This position allows the occupant to raise themselves above the windshield, for air flow and visibility. Instead of standing, leaning takes some of the weight off the legs and still has side supports for the hips. This position is obtained by leaving the seat back assembly in the down position and rotating the seat base assembly vertical. The front of the seat base assembly is designed with a platform and cushioning to make leaning into comfortable.

SUMMARY OF THE INVENTION

The invention provides an apparatus to support an individual sitting, leaning, or standing when traveling in a boat.

The apparatus is fastened to the boat deck. It comprises a seat base assembly seat back assembly and "seat back" frame. The "said" seat base assembly rotates about a pivot from a reclined back position to a generally vertical position. The seat back assembly moves and pivots from an angled back lower position to generally vertical upper position. Notches are provided to lock the seat back assembly into positions.

The seat base assembly in the sloped back position and the seat back assembly in me lower position provide a seat for sitting.

The seat base assembly when rotated vertically and the seat back assembly moved and pivoted to the upper position provides a bolster for standing.

In addition to the above stated invention is the additional improvement of the apparatus that would allows an individual to lean into it. The seat base assembly would be designed to have cushioning at the front so when it is rotated vertically an individual can sit on or lean into it. This position leaves the seat back assembly in the lower position to support the back and hips.

DESCRIPTION OF THE DRAWINGS

FIG. 1 is a isometric view of a boat embodying the invention and including a seat apparatus. The seat apparatus is shown in the stand up position.

FIG. 2 is a isometric view of a boat with a seat apparatus. It is shown in the lower sitting position "and mounted on a swivel plate".

FIG. 3 is a perspective view of the seat apparatus showing its various components in the stand up bolster position.

FIG. 4 is a perspective view of the seat apparatus in the sitting position showing its various components.

Figure 7:
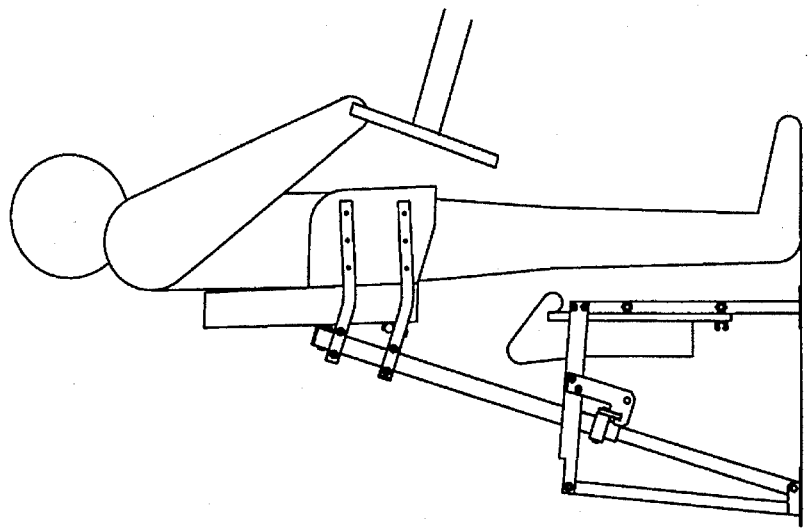
FIG. 7 is a side elevation view showing the seat apparatus being used in the standing position.

Before one embodiment of the invention is explained in detail, it is to be understood that the invention is not limited in its application to the details of construct and arrangement of components set forth in the following description or illustrated in the drawings. The invention is capable of other embodiments and of being practiced or carried out in various ways. Also it is understood that the phraseology and terminology used herein is for the purpose of description and should not be regarded as limiting.

| ITEM | QUAN | DESCRIPTION |
| --- | --- | --- |
| 1 | 1 | seat back |
| 2 | 2 | side supports |
| 3 | 2 | outer tube |
| 4 | 1 | seat base with cushioned platform |
| 5 | 2 | pivot bearing |
| 6 | 2 | front leg upright |
| 7 | 4 | side rail |
| 8 | 2 | innertube |
| 9 | 2 | pivot bolt |
| 10 | 2 | rear leg upright |
| 11 | 2 | adjustable position locking latch |
| 12 | 2 | locking hook |
| 13 | 4 | deck mounting plate |
| 14 | 2 | locking ring |
| 15 | 2 | locking notch |
| 16 | 2 | back support tube |
| 17 | 2 | vertical holding clips |
| 18 | 2 | horizontal holding clips |
| 19 | 1 | front cross brace |
| 20 | 4 | side support clamps |
| 21 | 1 | boat deck |
| 22 | 1 | seat apparatus |
| 23 | 1 | rear cross brace |
| 24 | 1 | seat back assembly |
| 25 | 1 | seat base support tube |
| 26 | 1 | seat base assembly |
| 27 | 1 | boat |
| 28 | 1 | boat hull |
| "29 | 1 | swivel plate" |

DESCRIPTION OF THE PREFERRED EMBODIMENT

A boat embodying the invention is illustrated in FIG. 1. The boat 27 comprises a hull 28, a deck 21 supported by the hull 28, and a seat apparatus 22, mounted on the deck 21.

"An optional addition to the invention is shown in FIG. 2. A swivel plate 29 is mounted between the deck 21 and seat apparatus 22."

Figure 6:
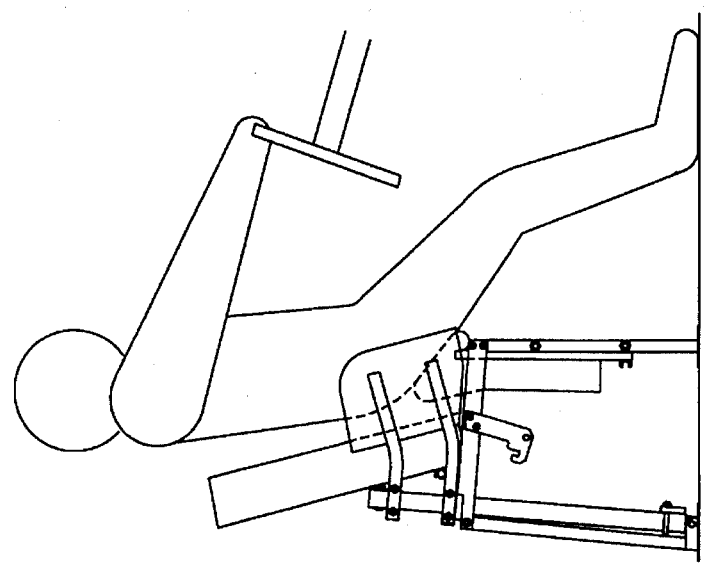
FIG. 6 is a side elevation view showing the seat apparatus being used in the leaning position.
Figure 5:
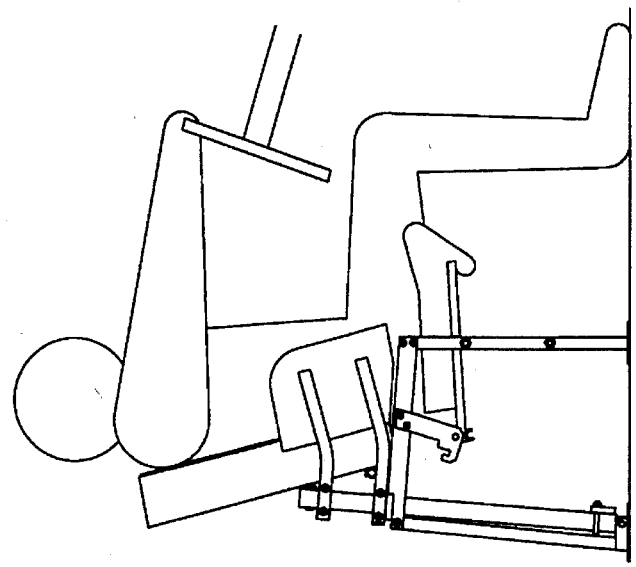
FIG. 5 is a side elevation view showing the seat apparatus being used in the sitting position.

As shown in FIGS. 3, 4, 5, 6, and 7, the seat apparatus 22 is mounted to the deck 21. The deck mounting plates 13 are fixed to a front and rear leg upright 6 and 10 respectively. The front and rear uprights 6 and 10 are attached together by the side rails 7. The left and right front and rear uprights 13 and 10 are attached by a front and rear cross brace 19 and 23 respectively.

A seat back 1, side supports 2, outer tubes 3, locking latch 11, and locking ring 14 are all fixed together to form a seat back assembly 24. The seat back assembly 24 moves upward by the outer tubes 3 telescoping on a inner tubes 8. The seat back assembly 24 also pivots forward and backwards on pivot bolt 9 while telescoping. Pivoting range is limited by the rear leg upright 10 in the backward direction and locking hook 12 in the forward direction. The seat back assembly 24 is locked into the lower position by locking rings 14 dropping into locking notches 15. The locking notches 15 are formed by a cutout in the side rails 7. The seat back assembly 24 is locked into the upper position by the locking latches 11 dropping into the locking hooks 12. The locking hooks 12 are fixed to the side rails 7.

A seat base assembly 213 includes a seat base 4 fixed to a seat base support tube 25 and pivot bearings 5. The front of the seat base has a cushioned platform attached to it at an angle. The seat base assembly 26 rotates on a front cross brace 19 between a generally sloped back horizontal position to a generally vertical position.

The seat base assembly is held in its positions by holding clips 17 and 18.

Conclusions, Ramifications, and Scope of the Invention

The purpose of this invention is to provide a inexpensive, easy to use, comfortable structure to support an individual traveling in a boat. Whether sitting, leaning, or standing the individual can feel comfortable, secure and safe while traveling in various sea conditions.

The smaller boats experience the roughest rides due to waves. The invention described herein is designed particularly to fit the need of this size boat, to provide relaxed sitting for pleasant conditions and comfortable safe standing for the rougher conditions.

Various features of the invention are set forth in the following claims.

I claim:

1. A seat apparatus comprising:

a frame;

a seat back assembly;

a telescoping support member having one end rotatably attached to said frame and the other end attached to said seat back assembly for adjusting the position of the seat back assembly from a lower aft position with the seat back assembly sloped backward to an upper forward position with the seat back assembly generally vertical; and a seat base assembly, rotatably attached to said frame and moveable between a seat-down position with the seat base assembly slightly sloped backward and a seatup position with the seat base assembly generally vertical.

2. A seat apparatus as recited in claim 1, further comprising a fastener for locking the seat back assembly in its upper position, said fastener being adjustably attached to the telescoping support member to allow variation of the seat back assembly height.

3. A seat apparatus as set forth in claim 2, wherein said seat base assembly further includes a support tube and said frame includes a flexible clip for receiving said support tube, said clip having an opening slightly smaller than the tube diameter such that the clip snaps closed after receiving the tube, thereby locking the seat base assembly into position.

4. A seat apparatus, comprising:
   a frame;
   a seat back assembly;
   a seat base assembly pivotable upwardly and rearwardly from a first sloped back position to a second generally vertical position, said seat back assembly and seat base assembly being attached to said frame; and
   said seat base assembly including a seat base providing a first seating surface when in the first seating position, said seat base having a cushioned platform mounted to the front thereof and extending downwardly at an angle thereto when said seat base assembly is in said first position said cushioned platform providing a second seating surface when said seat base assembly is in said second position, whereby a person can sit or lean on said cushioned platform when the seat base assembly is rotated to said second position.

5. A seat apparatus as set forth in claim 4, wherein said seat base assembly further includes a support tube and said frame includes a flexible clip for receiving said support tube, said clip having an opening slightly smaller than the tube diameter such that the clip snaps closed after receiving the tube, thereby locking the seat base assembly into position.

* * * * *